Dec. 12, 1939.  L. F. CARTER  2,183,133
ARTIFICIAL HORIZON
Filed Sept. 8, 1938

INVENTOR
Leslie F. Carter
BY Herbert H. Thompson
HIS ATTORNEY

Patented Dec. 12, 1939

2,183,133

UNITED STATES PATENT OFFICE 2,183,133

ARTIFICIAL HORIZON

Leslie F. Carter, Leonia, N. J., assignor to Sperry Gyroscope Company, Inc., Brooklyn, N. Y., a corporation of New York Application September 8, 1938, Serial No. 228,884

4 Claims. (Cl. 33—204)

This invention relates to gyroscopic artificial horizons for aircraft. More particularly, this invention is an improvement in the type of artificial horizon as shown in the prior patent to Bert G. Carlson, No. 2,044,150, dated June 16, 1936, and now in common use.

For ordinary flying, it is desirable that a slight change in the fore and aft inclination of the craft about its lateral axis be shown up quickly and noticeably by the horizon indicator. This is found to be more important than showing the exact angle of inclination. To this end, I have interposed additional linkage in the connections between the gyroscope casing and arm carrying the horizon bar, so that a greatly magnified movement occurs during the first few degrees of tilt of the craft either up or down, which movement rapidly grows less in proportion to the tilt, so that the bar is never moved out of sight or off the scale regardless of the gyrations effected by the airplane.

Referring to the drawing illustrating the preferred form of my invention:

Figure 1:
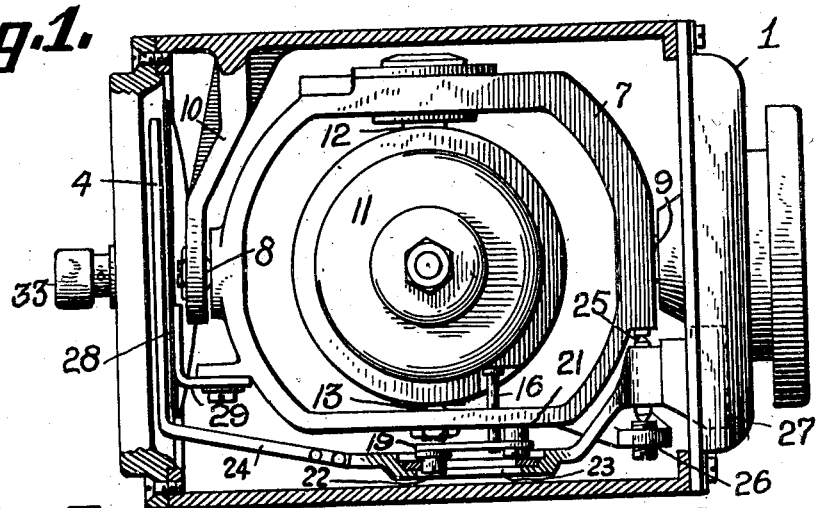
Fig. 1 is a plan view of the improved artificial horizon, the exterior casing being shown in section.

In the drawing, the artificial horizon is shown in conventional form, the same being enclosed in an outer air-tight casing 1, from which air is exhausted through pipe 2. The casing is shown as having a transparent front window 3 through which the horizon bar 4, the bank angle indications 5 and the miniature airplane 6 may be seen. The gyroscope proper is shown as having a gimbal ring 7 pivoted about fore and aft trunnions 8 and 9 within the casing 1, the forward pivot being shown as mounted in a bracket 10 extending from the side of the casing. Gimbal ring 7, in turn, pivotally supports the rotor bearing casing 11 on transverse pivots 13 and 12. The rotor, not shown, is spun within the casing 11 on a normally vertical axis by any suitable means such as an air jet, the air emerging through four slots 14 in the bottom of the casing, with which pivoted pendulums 15 cooperate to erect the gyroscope as well understood in the art.

A curved background member 28 is shown as secured to an arm projecting from the gimbal ring 7. As said background member tilts with the gyroscope, it may be provided with an index member 30, readable on the aforesaid mentioned scale 5 around the periphery of the front window.

Means are also provided for the vertical adjustment of the miniature airplane 6 to allow for different loading of the craft, so that the horizon bar 4 and miniature airplane 6 may be brought into register for the normal flying attitude at the time. To this end, the miniature airplane is mounted on a rack bar 31, slidingly mounted behind the front window and vertically adjustable by means of a small pinion 32 on the shaft of the setting knob 33.

Figure 2:
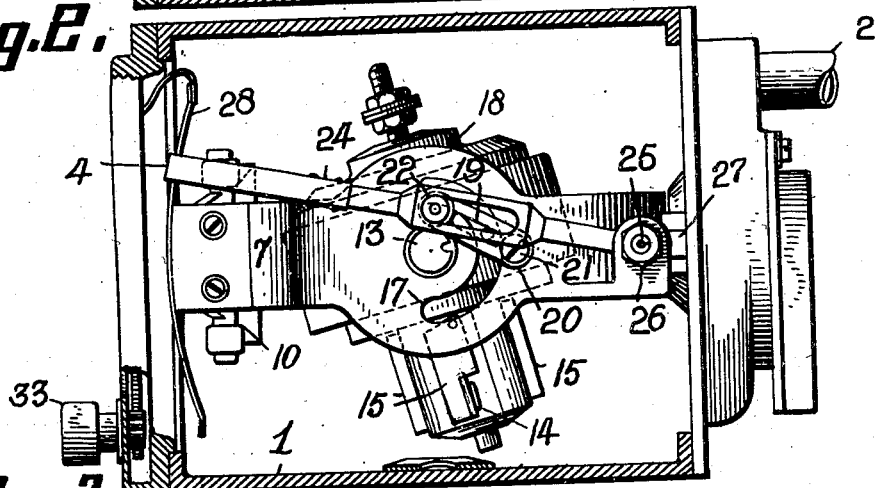
Fig. 2 is a side elevation of same with the casing in section.
Figure 3:
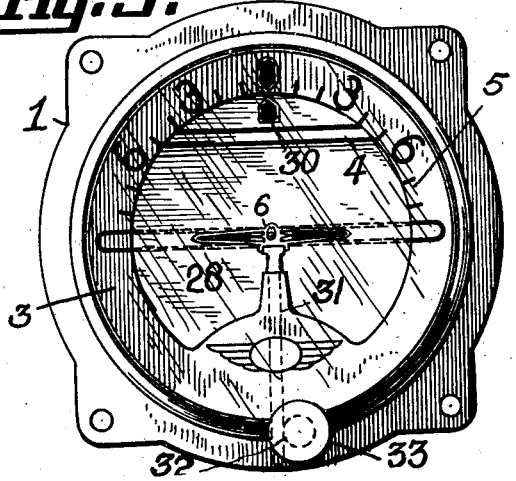
Fig. 3 is a face view of the instrument.
Figure 4:
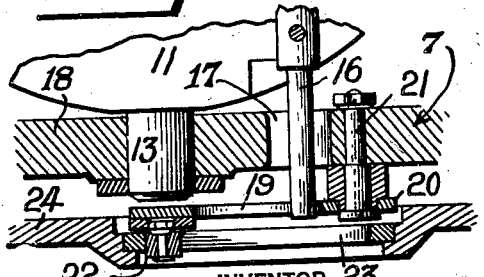
Fig. 4 is an enlarged sectional detail of the linkage mechanism connecting the horizon bar and rotor bearing casing.

Projecting from the side of the rotor bearing casing to the rear of pivot 13 is a pin 16 which projects through an annular slot 17 in an enlargement 18 in gimbal ring 7. Said pin engages the walls of a slot 19 in a short lever or link 20, pivoted by pin 21 to the gimbal ring at one end and provided at its other end with a pin and roller 22. The roller engages the walls of a slot 23 in the lever or arm 24, which carries at its outer end the horizon bar 4. Said arm 24 is shown as pivoted at 26 to the gimbal ring 7 and is provided with a counter-balancing weight 27 beyond the pivot. The axis of pivot pin 25 is parallel with the axis 12, 13 of the rotor bearing ring. When inclination first starts, the pin 16 which is relatively close to the pin 21, moves the lever 19 through a substantial angle as shown in Fig. 2, thereby moving arm 24 through a much greater angle than it would have been moved if it had been moved directly from pin 16, as in the prior patent. At the same time, the arm 24 can only be moved through a predetermined angle, since as inclination increases, the angular movement of the arm rapidly decreases and it approaches the upper limit as the link 19 nears its vertical position.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having described my invention, what I desire to claim and secure by Letters Patent is:

1. In an artificial horizon for aircraft, a rotor and rotor bearing member, a gimbal ring in which said member is pivotally mounted on a transverse axis, an outer casing in which said gimbal is pivoted on a fore and aft axis, a horizon bar member pivoted on a transverse axis on said gimbal behind said first axis, a connecting link also pivoted on said gimbal and having a pin and slot connection with said bar, and a pin and slot connection between said link and said bearing member near said pivotal connection of said link and gimbal, whereby the initial movements of the bar are exaggerated.

2. In an artificial horizon for airplanes, a gyroscope, a gimbal ring mounting therefor having its major axis trunnions fore and aft of the airplane and minor axis trunnions transverse, a lever pivoted on said gimbal ring about an axis parallel to said minor axis and to the rear thereof, a normally horizontal indicator bar mounted at the forward end of said lever, a crank pin extending from said gyroscope through said gimbal, and an intermediate link between said pin and said lever to increase the initial movements of said bar on pitch of the craft.

3. In an artificial horizon for aircraft, a self-erecting gyro-vertical, a gimbal ring supporting said gyroscope for oscillation about a transverse axis, a housing supporting said gimbal ring for oscillation about a longitudinal axis, a horizon bar member mounted for oscillation about a second transverse axis on said gimbal ring, a pin on said gyro, a slotted lever pivoted on said gimbal ring and engaged by said pin, and another pin mounted on said lever and engaging a slot in said horizon bar member, whereby indications of initial longitudinal tilt of said gyroscope are magnified twice.

4. In an artificial horizon for aircraft, a gyroscope, a gimbal ring therefor, a horizon bar for indicating tilt of said gyro about a transverse axis, a plurality of pin and slot operated members connecting said gyro and said bar, including a pin on said gyro, a lever pivoted on said ring at one end having a pin at its other end, and an intermediate slot engaged by the pin on said gyro, a second lever pivoted on said ring at one end and carrying said horizon bar at its outer end, and having an intermediate slot engaged by said second pin, whereby an amplified indication of the initial tilt of said gyroscope is produced by said bar while, as the tilt increases, the degree of amplification diminishes.

LESLIE F. CARTER.